US011089000B1

(12) United States Patent
Muthusamy et al.

(10) Patent No.: US 11,089,000 B1
(45) Date of Patent: Aug. 10, 2021

(54) AUTOMATED SOURCE CODE LOG GENERATION

(71) Applicant: INTERNATIONAL BUSINESS MACHINES CORPORATION, Armonk, NY (US)

(72) Inventors: Thangadurai Muthusamy, Bangalore (IN); Pietro Iannucci, Rome (IT); Saravanan Devendran, Bangalore (IN); Obuliraj Selvaraj, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 16/787,293

(22) Filed: Feb. 11, 2020

(51) Int. Cl.
| *G06F 9/44* | (2018.01) |
| *H04L 29/06* | (2006.01) |
| *G06F 8/36* | (2018.01) |
| *G06F 8/34* | (2018.01) |
| *G06F 8/41* | (2018.01) |
| *G06F 9/46* | (2006.01) |
| *G06F 21/14* | (2013.01) |
| *H04L 9/32* | (2006.01) |
| *H04L 9/30* | (2006.01) |

(52) U.S. Cl.
CPC .......... *H04L 63/0428* (2013.01); *G06F 8/34* (2013.01); *G06F 8/36* (2013.01); *G06F 8/41* (2013.01); *G06F 9/46* (2013.01); *G06F 21/14* (2013.01); *H04L 9/3073* (2013.01); *H04L 9/3247* (2013.01)

(58) Field of Classification Search
CPC . H04L 9/3073; H04L 63/0428; H04L 9/3247; G06F 21/14; G06F 9/46; G06F 8/36; G06F 8/34; G06F 8/41
See application file for complete search history.

(56) References Cited

U.S. PATENT DOCUMENTS

| 7,983,879 | B1 | 7/2011 | Vetsch |
| 8,037,450 | B2 | 10/2011 | Goebel |
| 8,374,997 | B2 | 2/2013 | Phibbs, Jr. |
| 9,286,191 | B2 | 3/2016 | Carson |
| 2006/0225049 | A1 | 10/2006 | Lv |
| 2006/0265354 | A1 | 11/2006 | Phibbs, Jr. |
| 2007/0234070 | A1* | 10/2007 | Horning ................. G06F 21/14 713/190 |
| 2009/0007065 | A1 | 1/2009 | Becker |
| 2009/0037894 | A1 | 2/2009 | Unger |
| 2013/0262617 | A1 | 10/2013 | Ligman |

(Continued)

*Primary Examiner* — Tuan A Vu
(74) *Attorney, Agent, or Firm* — Schmeiser, Olsen & Watts, LLP; Michael A. Petrocelli

(57) ABSTRACT

A method, system, and program product for generating an automated source code log statement is provided. The method includes retrieving source code of a software application and associating logs and associated semantics with the source code. The source code is parsed and analyzed and log statements are generated. Attributes within the source code are identified. The log statements are inserted into the source code with respect to a specified source code level of the source code and the source code comprising the log statements is presented to a developer. A command for modifying the logs is received. In response, the logs are modified resulting in modified logs. The source code comprising the log statements and modified logs is executed.

20 Claims, 7 Drawing Sheets

(56) References Cited

U.S. PATENT DOCUMENTS

| | | | |
|---|---|---|---|
| 2014/0281535 A1* | 9/2014 | Kane | H04L 63/0428 |
| | | | 713/168 |
| 2015/0347094 A1 | 12/2015 | Lattner | |
| 2019/0199692 A1* | 6/2019 | Atta | H04L 9/3247 |
| 2020/0137097 A1* | 4/2020 | Zimmermann | G06F 9/46 |
| 2020/0313878 A1* | 10/2020 | Wang | H04L 9/3073 |

* cited by examiner

AUTOMATED SOURCE CODE LOG GENERATION

BACKGROUND

The present invention relates generally to a method for automatically generating a source code log statement and in particular to a method and associated system for improving software technology associated with parsing source code, generating log statements associated with logs, inserting the log statements into the source code, modifying the logs, and executing the source code including the log statements and modified logs.

SUMMARY

A first aspect of the invention provides an automated source code log statement generation method comprising: retrieving, by a processor of a hardware device, source code of a software application; associating, by the processor, logs and associated semantics with the source code; parsing and analyzing, by the processor executing log builder software, the source code; automatically generating, by the processor, log statements associated with the logs and the associated semantics; identifying, by the processor based on a pattern set of a user, attributes within the source code, wherein the attributes comprise confidential and sensitive information of the user; automatically inserting, by the processor, the log statements into the source code with respect to a specified source code level of the source code, wherein the log statements inserted into the source code are configured to encrypt the attributes; presenting, by the processor to a developer, the source code comprising the log statements; receiving, by the processor from the developer in response to the presenting, a command for modifying the logs; modifying, by the processor in response to the command, the logs resulting in modified logs; and executing, by the processor, the source code comprising the log statements and the modified logs.

A second aspect of the invention provides a computer program product, comprising a computer readable hardware storage device storing a computer readable program code, the computer readable program code comprising an algorithm that when executed by a processor of hardware device implements an automated source code log statement generation method, the method comprising: retrieving, by the processor, source code of a software application; associating, by the processor, logs and associated semantics with the source code; parsing and analyzing, by the processor executing log builder software, the source code; automatically generating, by the processor, log statements associated with the logs and the associated semantics; identifying, by the processor based on a pattern set of a user, attributes within the source code, wherein the attributes comprise confidential and sensitive information of the user; automatically inserting, by the processor, the log statements into the source code with respect to a specified source code level of the source code, wherein the log statements inserted into the source code are configured to encrypt the attributes; presenting, by the processor to a developer, the source code comprising the log statements; receiving, by the processor from the developer in response to the presenting, a command for modifying the logs; modifying, by the processor in response to the command, the logs resulting in modified logs; and executing, by the processor, the source code comprising the log statements and the modified logs.

A third aspect of the invention provides a hardware device comprising a processor coupled to a computer-readable memory unit, the memory unit comprising instructions that when executed by the processor implements an automated source code log statement generation method comprising: retrieving, by the processor, source code of a software application; associating, by the processor, logs and associated semantics with the source code; parsing and analyzing, by the processor executing log builder software, the source code; automatically generating, by the processor, log statements associated with the logs and the associated semantics; identifying, by the processor based on a pattern set of a user, attributes within the source code, wherein the attributes comprise confidential and sensitive information of the user; automatically inserting, by the processor, the log statements into the source code with respect to a specified source code level of the source code, wherein the log statements inserted into the source code are configured to encrypt the attributes; presenting, by the processor to a developer, the source code comprising the log statements; receiving, by the processor from the developer in response to the presenting, a command for modifying the logs; modifying, by the processor in response to the command, the logs resulting in modified logs; and executing, by the processor, the source code comprising the log statements and the modified logs.

The present invention advantageously provides a simple method and associated system capable of accurately generating a source code log statement.

DETAILED DESCRIPTION

Figure 1:
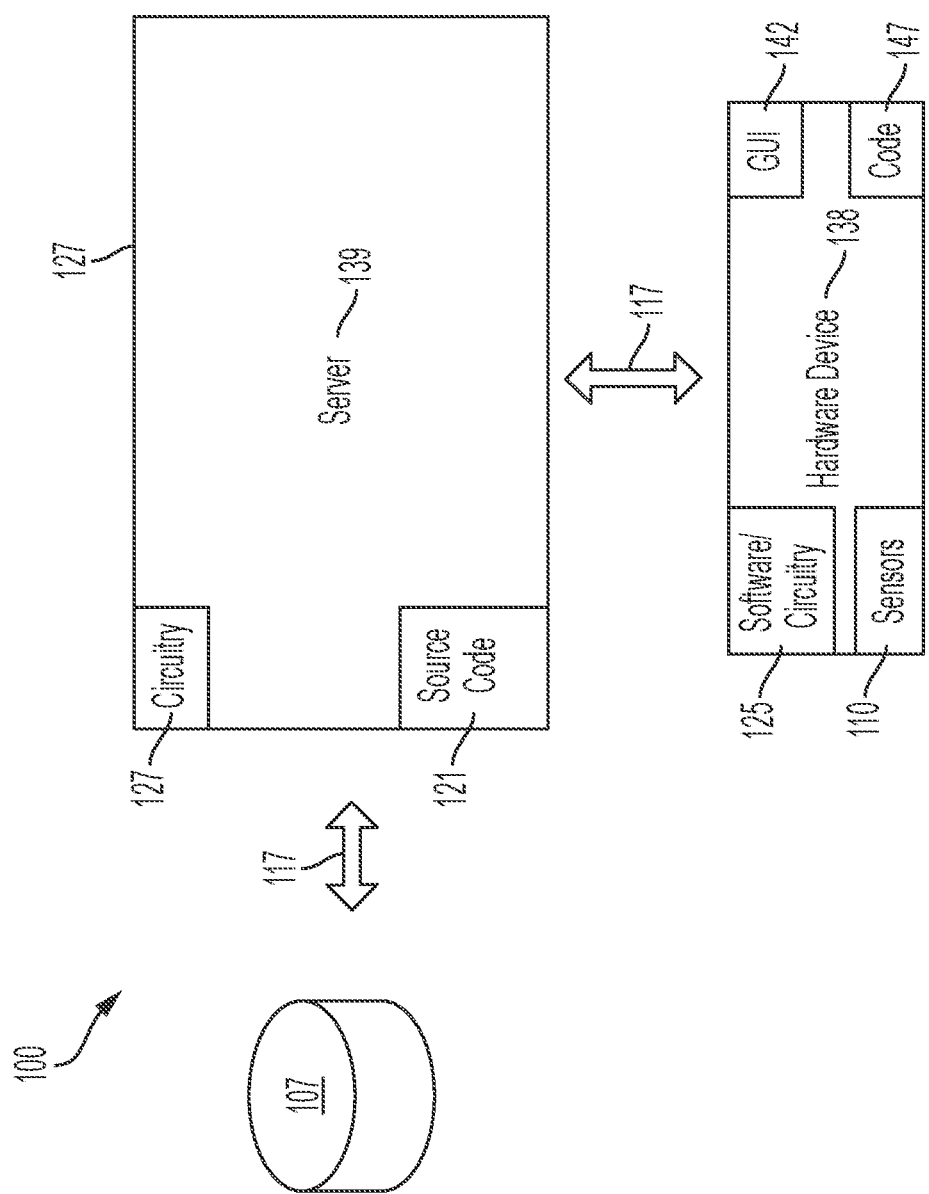
FIG. 1 illustrates a system for improving software technology associated with generating log statements associated with logs, inserting the log statements into source code, and executing the source code including the log statements and modified logs, in accordance with embodiments of the present invention.

FIG. 1 illustrates a system 100 for improving software technology associated with generating log statements associated with logs, inserting the log statements into source code, and executing the source code including the log statements and modified logs, in accordance with embodiments of the present invention. System 100 addresses issues associated with a typical software production environment associated with enabling a developer to understand a root cause of software issues with respect to insufficient logging information residing within originating source code. Insufficient logging information residing within originating source code may be caused due to an inability of the developer(s) to insert adequate logging information within the originating source code. Logging information may be essential for enabling a troubleshooting process associated with an error with respect to a software production environment. Additionally, a developer(s) may not maintain a consistency of log comments strings used within a software application as a number of log statement may vary from developer to developer due to a manual input process. Therefore, system 100 is enabled to execute a process for inserting logging statements across a software application/code base thereby allowing an entire code base of a software product to remain intact with respect to a specified logging level. Additionally, system 100 enables an automated process such that a is not required to manually add any log statements during software development thereby increasing a speed of software development execution and allowing the developer to focus on a logic of software functions.

System 100 of FIG. 1 includes a server 139 (i.e., specialized hardware device), a hardware device 138, and a database 107 (e.g., a cloud-based system) interconnected through a network 117. Server 139 includes specialized circuitry 127 (that may include specialized software) source 121 (i.e., including machine-learning software code). Hardware device 138 may include, inter alia, a computing device, a dedicated hardware device, etc. Hardware device 138 includes specialized circuitry 125 (that may include specialized software), sensors 110, code 147, and a GUI 142. Code 147 may include, inter alia, source code (including logs, log statements, etc.), compiled code, etc. Sensors 110 may include any type of internal or external sensor (or biometric sensor) including, inter alia, ultrasonic three-dimensional sensor modules, an optical sensor, a video retrieval device, an audio retrieval device, humidity sensors, a temperature sensor, voltage sensors, a keyboard, a mouse, a touch screen, etc. Server 139 and hardware device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 139 and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with generating log statements associated with logs, inserting the log statements into source code, and executing the source code including the log statements and modified logs. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following process for automatically instrumenting source code (within a static project code base) with log/trace statements during a software development phase and enabling log level consistency across code software code bases at an organization level. The process is initiated when log statements or log entries are automatically generated and inserted within a single entry point within source code. Additionally, the log statements or log entries may be inserted within recurring points of the source code such as, inter alia, entry/exit points or at variable change points based on a logging strategy/rules set (e.g., predefined or user-defined rules such as trace all error catch situations, trace all the changes of a particular variable across the code, trace all the entry/exit of all methods that modify a particular variable, etc.) that may be initially determined by a single developer or at a project level. Likewise, log statements may be inserted at a class/package/application level therefore enabling a developer to configure a required logging level before a compile time or run time based on a configuration. Standardized log semantics/messages that are consistent across code bases with the type ahead support may be provided within the source code. An additional software mechanism may be enabled for removing inserted log statements via a specified configuration such that log statements inserted by system 100 will be removed and log statements added by the developer are not removed.

System 100 enables a set of predefined rules (e.g., implemented in software) for introducing logs to source code. The rules are configured to introduce the logs with respect to every class/function within the code base for a variety of programming languages. System 100 may additionally be configured to access a specific logging framework executing a logging process such as, inter alia, log 4j2 or Logback, Node-Loggly, Winston, etc. The aforementioned logging process is configured to standardize logs across projects within an organization. Rules configured to introduce logs may include, inter alia, entry-exit rules, variable rules, statement rules, recursive rules, etc. Entry-exit rules enable a process for tracing all the entry and exit points for processes within an associated class or a package. Variable rules enable a process for tracing the changes with respect to local variables within an associated class or a package. Statement rules enable a process for tracing statements with respect to an associated class or a package or included within a particular comment block. Recursive rules enable a process for tracing all entry/exit points or variables or statements with respect to an associated class and of all functions called.

System 100 may be configured to specify logging rules for application within development and production environments prevent production code form being overwhelmed by traces. System 100 may additionally generate user defined rules based on user review comments. The rules are reviewed with group of developers for approval and rule additions thereby increasing a collaborative confidence of system 100. For example, if a developer requests that a log statement be added in addition to system log statement additions, the request is transmitted for review and upon approval, a same rule will be added to a logger builder structure (e.g., logger builder structure 510 in FIG. 410 in FIG. 4, infra). When a new rule is added into the logger builder, the new rule will be considered during a next iteration during a log statement insertion thereby enabling system 100 to self-learn at a regular interval for improve software functionality accuracy. Likewise, pre-defined logs and user defined logs are added to the logger builder for referral by system 100 during a process for injecting logs into a source code base and specifying log semantics. During a process for specifying log semantics, a developer will have an option for auto filling code line as well as standardizing log message strings across the source code base. The aforementioned rules may provide the following item descriptions within a log statement: logging sensitive information, excessive logging, cryptic log messages, and logging with JSON. Logging sensitive information descriptions may include user credentials or financial information. Excessive logging descriptions may be associated with too many log messages thereby leading to difficulty in reading a log file and identifying relevant information when a problem is detected. Logging important information across cross-cutting concerns within system 100 may reduce a number of log lines of code. Cryptic log message descriptions may be enabled for adding context within log messages by including a timestamp, a log level, a thread name, and a fully qualified class name of the event. Logging with JSON descriptions may enable JSON as a primary application log format thereby allowing the source code to be as readable as plain text and allowing for a parsing process to be performed by automated processing tools.

System 100 enables a process for generating standardized log semantics that allow for an efficient means for reading and analyzing log data via execution of standardized log messages for searching for all instances of a particular event or extracting meaningful insights from log data.

Figure 2:
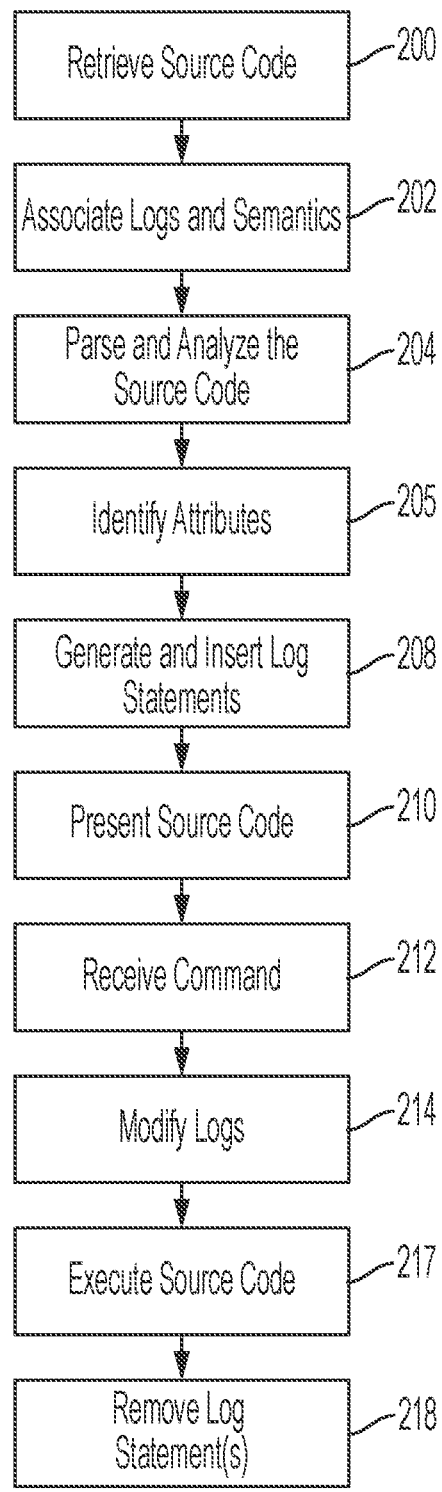
FIG. 2 illustrates an algorithm detailing a process flow enabled by the system of FIG. 1 for improving software technology associated with generating log statements associated with logs, inserting the log statements into source code, and executing the source code including the log statements and modified logs, in accordance with embodiments of the present invention.

FIG. 2 illustrates an algorithm detailing a process flow enabled by system 100 of FIG. 1 for improving software and video technology associated with parsing audio and video data from an audio/video file, executing an associated query, and generating a natural language response with respect to said natural language query and a node comprising similar features with respect to a parsed query entity, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server 139 and/or hardware device 138. In step 200, source code of a software application is retrieved by a hardware device. The source code may be selected from a database such that retrieving the source code is initialized based on the selection. Alternatively, the source code may be generated such that retrieving the source code is initialized based on the generated source code.

In step 202, logs and associated semantics are associated with the source code. In step 204, the source code is parsed and analyzed via execution of log builder software. In step 205, Attributes within the source code are identified based on a pattern set of a user. The attributes may include confidential and sensitive information of the user. In step 208, log statements associated with the logs and associated semantics are automatically generated. The log statements are automatically inserted into the source code with respect to a specified source code level of the source code. The log statements inserted into the source code may be configured to encrypt the attributes. Automatically inserting the log statements may include, inter alia, inserting the log statements into the source code at a single location of the source code or inserting the log statements into the source code at multiple recurring locations of the source code. The specified source code level of the source code may include a level such as a class level, a package level, an application level, etc.

In step 210, the source code comprising the log statements is presented to a developer. In step 212, a command for modifying the logs is received from the developer in response to step 210. In step 214, the logs are modified in response to the command of step 212. The logs may be modified by adding additional logs to the logs via GUI auto fill execution.

In step 217, the source code comprising the log statements and modified logs is executed. Executing the source code may include compiling or running the source code comprising the log statements and the modified logs. In step 218, at least one system inserted log statement is removed from the source code.

Figure 3:
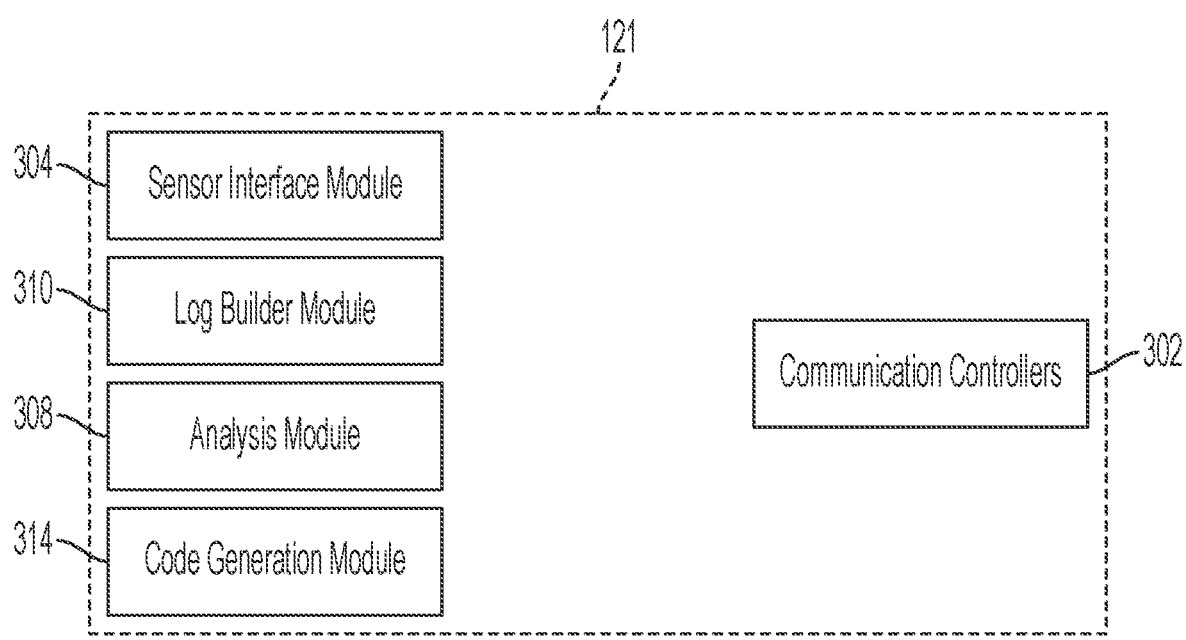
FIG. 3 illustrates an internal structural view of the software/circuitry structure of FIG. 1, in accordance with embodiments of the present invention.

FIG. 3 illustrates an internal structural view of software/circuitry 125), in accordance with embodiments of the present invention. Software/circuitry 125 includes a sensor interface module 304, a log builder module 310, an analysis module 308, a code generation module 314, and communication controllers 302. Sensor interface module 304 comprises specialized hardware and software for controlling all functions related to sensors 110 of FIG. 1. Log builder module 310 comprises specialized hardware and software for controlling all functionality related to building all logs for implementing the process described with respect to the algorithm of FIG. 2. Analysis module 308 comprises specialized hardware and software for controlling all functions related to the source code analysis steps of FIG. 2. Code generation module 314 comprises specialized hardware and software for controlling all functions related to generating software code for the processes of FIG. 2. Communication controllers 302 are enabled for controlling all communications between sensor interface module 304, log builder module 310, analysis module 308, and code generation module 314.

Figure 4:
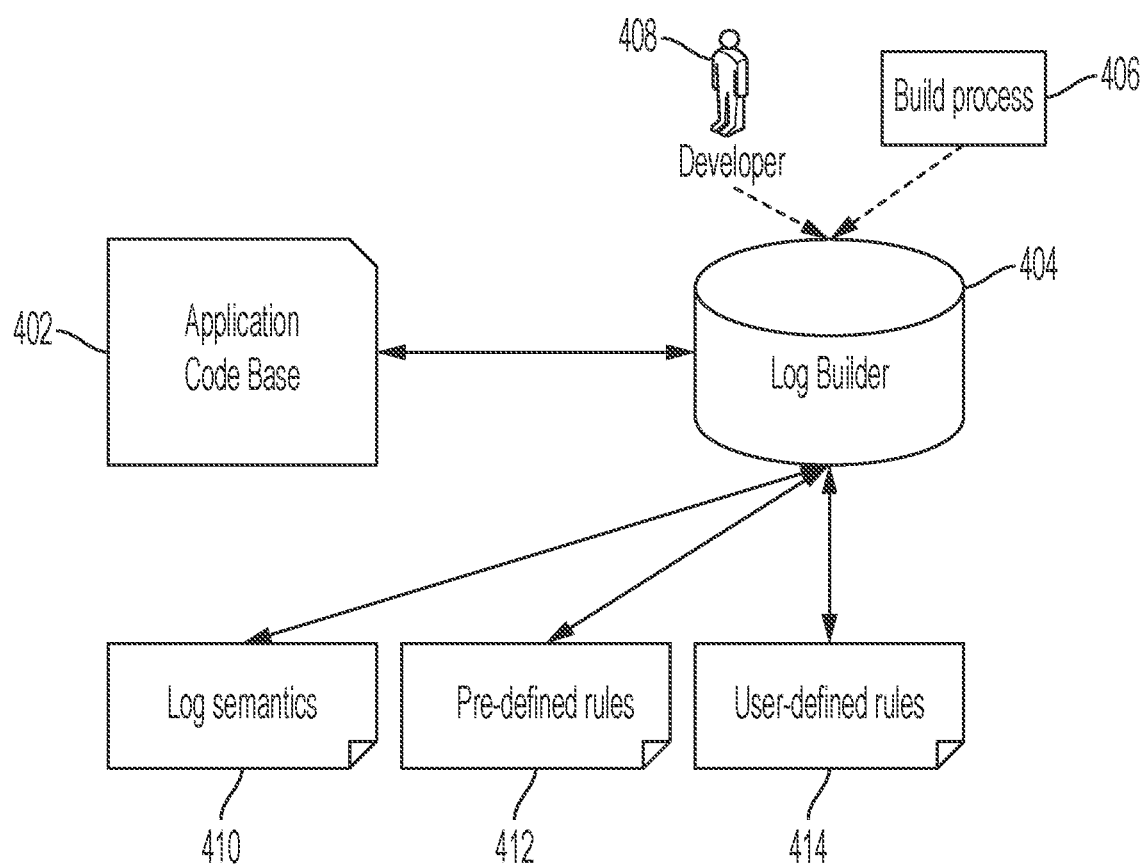
FIG. 4 illustrates an internal view of the hardware device of FIG. 1, in accordance with embodiments of the present invention.

FIG. 4 illustrates an internal view of hardware device 138 of FIG. 1, in accordance with embodiments of the present invention. The internal view illustrates an application code base 402, a log builder structure 404, a build process module 406, a developer 408, log semantics 410, predefined rules 412, and user defined rules 414. The internal view of FIG. 4 illustrates a process for selecting or generating application code base 402 for a software application. The application code base 402 is fed into log builder structure 404 for introducing log semantics 410. In response, log builder structure 404 parses application code base 402 based on predefined rules 412 and user defined rules 414 stored within log builder structure 404. A parsed version of the application code base 402 is modified with required logging statements. Subsequently, a developer 408 may review the logging statements and may determine that additional logging statements are required. If additional logging statements are required, build process module 406 will activate auto filling support for the log semantics to ensure consistency. The logging statements merged into compiled code and may be referred against any error within a production environment.

Figure 5:
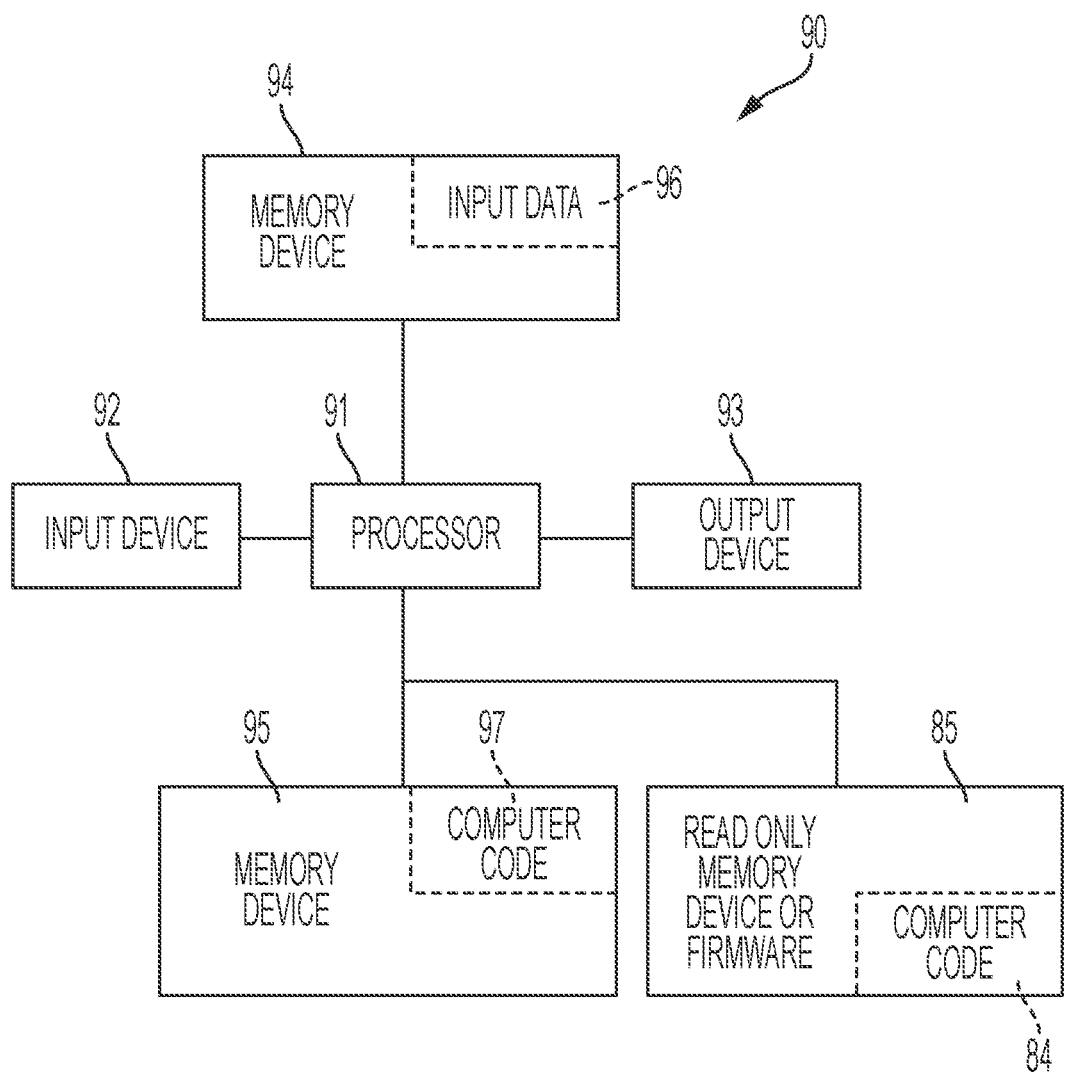
FIG. 5 illustrates a computer system used by the system of FIG. 1 for improving software technology associated with generating log statements associated with logs, inserting the log statements into source code, and executing the source code including the log statements and modified logs, in accordance with embodiments of the present invention.

FIG. 5 illustrates a computer system 90 (e.g., server 139 and/or hardware device 138 of FIG. 1) used by or comprised by the system of FIG. 1 for improving software and video technology associated with parsing audio and video data from an audio/video file, executing an associated query, and generating a natural language response with respect to said natural language query and a node comprising similar features with respect to a parsed query entity, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and video technology associated with parsing audio and video data from an audio/video file, executing an associated query, and generating a natural language response with respect to said natural language query and a node comprising similar features with respect to a parsed query entity. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and video technology associated with parsing audio and video data from an audio/video file, executing an associated query, and generating a natural language response with respect to said natural language query and a node comprising similar features with respect to a parsed query entity. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and video technology associated with parsing audio and video data from an audio/video file, executing an associated query, and generating a natural language response with respect to said natural language query and a node comprising similar features with respect to a parsed query entity. In another embodiment, the invention provides a business method that performs the process steps of the invention on a subscription, advertising, and/or fee basis. That is, a service supplier, such as a Solution Integrator, could offer to enable a process for improving software and video technology associated with parsing audio and video data from an audio/video file, executing an associated query, and generating a natural language response with respect to said natural language query and a node comprising similar features with respect to a parsed query entity. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
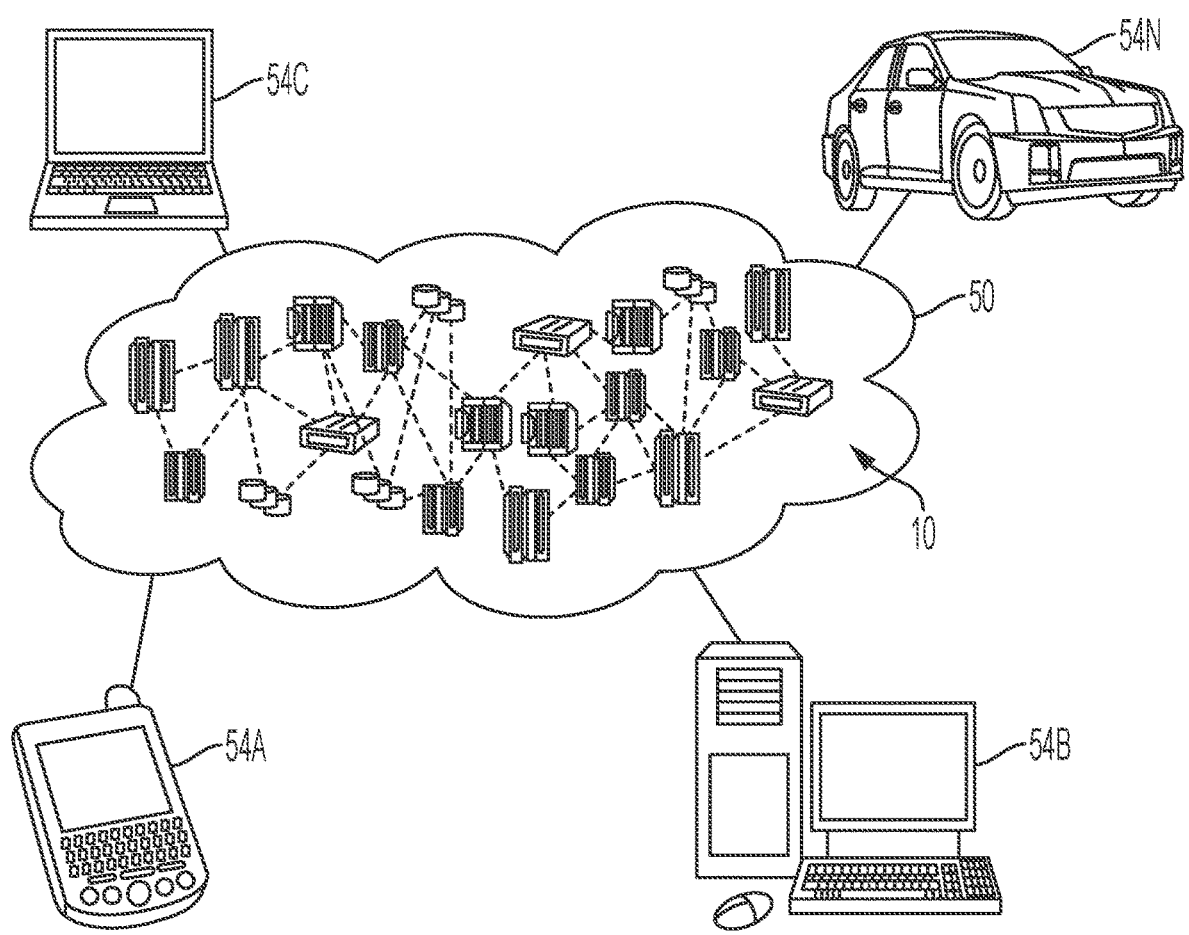
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
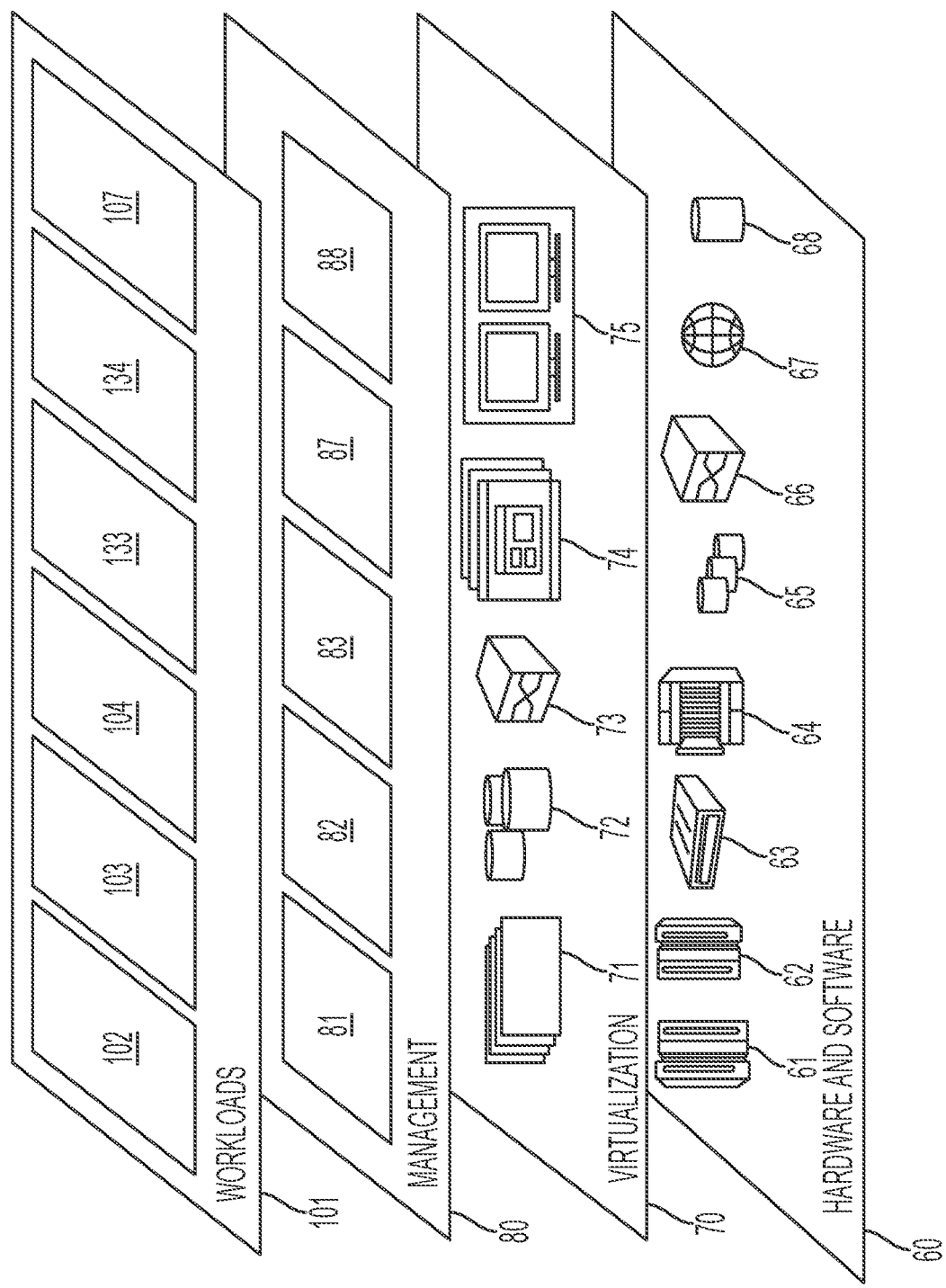
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software and video technology associated with parsing audio and video data from an audio/video file, executing an associated query, and generating a natural language response with respect to said natural language query and a node comprising similar features with respect to a parsed query entity 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated source code log statement generation method comprising:
   retrieving, by a processor of a hardware device, source code of a software application;
   associating, by said processor, logs and associated semantics with said source code;
   parsing and analyzing, by said processor executing log builder software, said source code;
   automatically generating, by said processor, log statements associated with said logs and said associated semantics;
   identifying, by said processor based on a pattern set of a user, attributes within said source code, wherein said attributes comprise confidential and sensitive information of said user;
   automatically inserting, by said processor, said log statements into said source code with respect to a specified source code level of said source code, wherein said log statements inserted into said source code are configured to encrypt said attributes;
   presenting, by said processor to a developer, said source code comprising said log statements;
   receiving, by said processor from said developer in response to said presenting, a command for modifying said logs;
   modifying, by said processor in response to said command, said logs resulting in modified logs; and
   executing, by said processor, said source code comprising said log statements and said modified logs.

2. The method of claim 1, wherein said executing comprises compiling said source code comprising said log statements and said modified logs.

3. The method of claim 1, wherein said executing comprises running said source code comprising said log statements and said modified logs.

4. The method of 1, further comprising:
   selecting, by said processor, said source code from a database, wherein said retrieving source code is initialized based on said selecting.

5. The method of 1, further comprising:
   generating, by said processor, said source code, wherein said retrieving source code is initialized based on said generating.

6. The method of 1, wherein said automatically inserting comprises inserting said log statements into said source code at a single location of said source code.

7. The method of 1, wherein said automatically inserting comprises inserting said log statements into said source code at multiple recurring locations of said source code.

8. The method of 1, wherein said specified source code level of said source code comprises a level selected from the group consisting of a class level, a package level, and an application level.

9. The method of 1, wherein said command for modifying said logs indicates a requirement for adding additional logs to said logs, and wherein said modifying said logs comprises adding said additional logs to said logs via GUI auto fill execution with respect to said adding.

10. The method of 1, further comprising:
    removing from said source code, by said processor, at least one log statement of said log statements, wherein said at least one log statement comprises a system inserted log statement.

11. The method of 1, further comprising:
    identifying, by said processor, said source code based on results of said analyzing, wherein results of said identifying are configured to enable said automatically generating said log statements.

12. The method of claim 1, further comprising:
    providing at least one support service for at least one of creating, integrating, hosting, maintaining, and deploying computer-readable code in the control hardware, said code being executed by the computer processor to implement: said retrieving, said associating, said parsing and analyzing, said automatically generating, said automatically inserting, said presenting, said receiving, said modifying, and said executing.

13. A computer program product, comprising a computer readable hardware storage device storing a computer readable program code, said computer readable program code comprising an algorithm that when executed by a processor of hardware device implements an automated source code log statement generation method, said method comprising:
    retrieving, by said processor, source code of a software application;
    associating, by said processor, logs and associated semantics with said source code;
    parsing and analyzing, by said processor executing log builder software, said source code;
    automatically generating, by said processor, log statements associated with said logs and said associated semantics;
    identifying, by said processor based on a pattern set of a user, attributes within said source code, wherein said attributes comprise confidential and sensitive information of said user;
    automatically inserting, by said processor, said log statements into said source code with respect to a specified source code level of said source code, wherein said log statements inserted into said source code are configured to encrypt said attributes;
    presenting, by said processor to a developer, said source code comprising said log statements;
    receiving, by said processor from said developer in response to said presenting, a command for modifying said logs;
    modifying, by said processor in response to said command, said logs resulting in modified logs; and
    executing, by said processor, said source code comprising said log statements and said modified logs.

14. The computer program product of claim 13, wherein said executing comprises compiling said source code comprising said log statements and said modified logs.

15. The computer program product of claim 13, wherein said executing comprises running said source code comprising said log statements and said modified logs.

16. The computer program product of claim 13, wherein said method further comprises:
    selecting, by said processor, said source code from a database, wherein said retrieving source code is initialized based on said selecting.

17. The computer program product of claim 13, wherein said method further comprises:
   generating, by said processor, said source code, wherein said retrieving source code is initialized based on said generating.

18. The computer program product of claim 13, wherein said automatically inserting comprises inserting said log statements into said source code at a single location of said source code.

19. The computer program product of claim 13, wherein said automatically inserting comprises inserting said log statements into said source code at multiple recurring locations of said source code.

20. A hardware device comprising a processor coupled to a computer-readable memory unit, said memory unit comprising instructions that when executed by the processor implements an automated source code log statement generation method comprising:
   retrieving, by said processor, source code of a software application;
   associating, by said processor, logs and associated semantics with said source code;
   parsing and analyzing, by said processor executing log builder software, said source code;
   automatically generating, by said processor, log statements associated with said logs and said associated semantics;
   identifying, by said processor based on a pattern set of a user, attributes within said source code, wherein said attributes comprise confidential and sensitive information of said user;
   automatically inserting, by said processor, said log statements into said source code with respect to a specified source code level of said source code, wherein said log statements inserted into said source code are configured to encrypt said attributes;
   presenting, by said processor to a developer, said source code comprising said log statements;
   receiving, by said processor from said developer in response to said presenting, a command for modifying said logs;
   modifying, by said processor in response to said command, said logs resulting in modified logs; and
   executing, by said processor, said source code comprising said log statements and said modified logs.

* * * * *